United States Patent
Wen et al.

(10) Patent No.: US 9,066,619 B2
(45) Date of Patent: Jun. 30, 2015

(54) METHOD AND APPARATUS FOR DECOCTING INGREDIENTS IN A SOLVENT

(75) Inventors: Tao Wen, Shanghai (CN); Gang Wang, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/997,856

(22) PCT Filed: Dec. 21, 2011

(86) PCT No.: PCT/IB2011/055845
§ 371 (c)(1),
(2), (4) Date: Jun. 25, 2013

(87) PCT Pub. No.: WO2012/090126
PCT Pub. Date: Jul. 5, 2012

(65) Prior Publication Data
US 2013/0287908 A1    Oct. 31, 2013

(30) Foreign Application Priority Data
Dec. 30, 2010    (WO) ................ PCT/CN2010/002221

(51) Int. Cl.
A47J 31/00    (2006.01)
A23L 1/221    (2006.01)
(Continued)

(52) U.S. Cl.
CPC ............ *A47J 31/002* (2013.01); *A23L 1/2215* (2013.01); *B01D 11/0265* (2013.01); *A47J 31/00* (2013.01); *A23F 5/206* (2013.01); *A47J 31/053* (2013.01); *A23L 1/3002* (2013.01); *A23F 5/44* (2013.01);
(Continued)

(58) Field of Classification Search
CPC ............ A23F 3/18; A23F 3/24; A23F 5/206; A23F 5/262; A23F 5/44; A23F 5/483; A47J 31/00; A47J 31/002; A47J 31/053; B01D 11/0215; B01D 11/0219; B01D 11/0265; A23L 1/3002; A23L 1/2215; A61K 8/97
USPC .......................................... 426/237; 99/302 R
See application file for complete search history.

(56) References Cited

U.S. PATENT DOCUMENTS

2006/0153758 A1    7/2006    Cheung
2009/0246341 A1    10/2009   Pitner et al.

FOREIGN PATENT DOCUMENTS

CN        2535032 Y    2/2003
CN        2600094 Y    1/2004
(Continued)

OTHER PUBLICATIONS

English Translation for CN201182919 published Jan. 2009.*
(Continued)

*Primary Examiner* — Anthony Weier

(57) ABSTRACT

An apparatus and method for decocting ingredients in a solvent wherein said apparatus includes a first container for containing the solvent, a pipe connecting an output of the first container to an input of the first container, and a pump placed in series with the pipe for circulating the solvent from the output to the input. The apparatus also includes a second container for containing the ingredients, where the second container is placed in series with the pipe such that the solvent circulating in the pipe can circulate in between the ingredients. A wave generator is placed next to the second container for generating a field of waves towards the ingredients.

20 Claims, 6 Drawing Sheets

(51) Int. Cl.
- *B01D 11/02* (2006.01)
- *A23F 5/20* (2006.01)
- *A47J 31/053* (2006.01)
- *A23L 1/30* (2006.01)
- *A23F 5/44* (2006.01)
- *A23F 3/24* (2006.01)
- *A23F 3/18* (2006.01)
- *A61K 8/97* (2006.01)
- *A23F 5/26* (2006.01)
- *A23F 5/48* (2006.01)
- *A47J 31/18* (2006.01)

(52) U.S. Cl.
CPC .............. *B01D 11/0215* (2013.01); *A23F 3/24* (2013.01); *A23F 3/18* (2013.01); *B01D 11/0219* (2013.01); *A61K 8/97* (2013.01); *A23F 5/262* (2013.01); *A23F 5/483* (2013.01); *A47J 31/18* (2013.01)

(56) References Cited

FOREIGN PATENT DOCUMENTS

| | | |
|---|---|---|
| CN | 2799038 Y | 7/2006 |
| CN | 201182919 Y | 1/2009 |
| CN | 101371856 A | 2/2009 |
| CN | 202078768 U | 12/2011 |
| GB | 2464806 A | 5/2010 |

OTHER PUBLICATIONS

Gao T Al: "Dynamic Microwave-Assisted Extraction of Flavonoids From Saussurea Medusa Maxim Cultured Cells"; Biochemical Engineering Journal 32 (2006) 79-83.

Tadeo et al: "Application of Ultrasound-Assisted Extraction to the Determination of Contaminants in Food and Soil Samples"; Journal of Chromatography A, 1217 (2010) pp. 2415-2440.

Ju et al:"Equipment for Microwave Extraction Used in Laboratory and Prospects"; Pharmaceutical & Engineering Design 2007, 28(3), 4 Page Document.

* cited by examiner

METHOD AND APPARATUS FOR DECOCTING INGREDIENTS IN A SOLVENT

FIELD OF THE INVENTION

The invention relates to a method and apparatus for decocting ingredients in a solvent.

The invention may be used in the field of drink or beverage preparation.

BACKGROUND OF THE INVENTION

Preparing beverages by decocting (raw) ingredients in a solvent is often used for preparing various drinks or traditional Chinese medicine beverages. For example, traditional Chinese medicine is prepared by decocting herbs/plants used as ingredients in hot/boiling water used as solvent, until solids/compounds (i.e. active nutrients) contained in the ingredients are extracted/diffused in the solvent. After a given period of time, ingredients are taken out of the solvent, and the resulting beverage is ready to drink. Traditionally, this process comprises the following steps:

Preparing the ingredients: pre-sizing (e.g. slicing and grinding), cleaning the ingredients. The ingredients could also be in powder form.

Soaking: putting the ingredients into cold water for a certain time. The purpose of this step is to allow water to enter into the cell structure of ingredients so as to later facilitate compound extraction in the solvent.

Decocting: putting ingredients in a recipient with boiling water so that compounds are extracted, from the ingredients, into the water.

Filtering: separating the ingredients from the solvent, so that users can consume a clean drink without residues.

However, such a process is not convenient for a user because it requires a lot of time-consuming successive steps, and also because the extraction can take up to a few hours, i.e. it takes a very long time before the beverage is ready. To speed-up the process, a user may be tempted to shorten the decocting time, but in that case nutrients might not all be extracted from the ingredients, resulting in a beverage which is not optimal from the point of view of solids/compounds contained in it, thereby affecting the taste or efficiency on the user's health.

OBJECT AND SUMMARY OF THE INVENTION

It is an object of the invention to propose an improved method and apparatus for decocting ingredients in a solvent.

To this end, the apparatus according to the invention comprises:
- a first container for containing the solvent,
- a pipe connecting an output of said first container to an input of said first container,
- a pump placed in series with said pipe for circulating the solvent from said output to said input,
- a second container for containing the ingredients, said second container being placed in series with said pipe, such that the solvent circulating in the pipe can circulate in between the ingredients,
- a wave generator placed next to said second container for generating a field of waves towards the ingredients.

Compared to the known decoction process where the solvent is static in the recipient and tends to quickly saturate around the ingredients, causing a slow extraction of compounds contained in the ingredients, the apparatus according to the invention allows, by creating a circulation of solvent in between the ingredients, continuous replacement of the solvent being present around the ingredients and having a high concentration of extracted compounds (i.e. saturated), by fresh solvent having a lower concentration of compounds. It thus allows accelerating extraction of the compounds present in the ingredients, thereby reducing the time duration of decocting. The field of waves generated by the wave generator allows creating pores in the membrane of the cells in the ingredients by the polarization effect, and/or allows disrupting the wall of those cells by the cavitation effect. The field of waves thus contributes to an increase in extraction efficiency of the compounds in the inner part of the ingredients, meaning that with such an apparatus, soaking of ingredients as in the prior art is not necessary anymore. With this invention, the dynamic circulation of the solvent, combined with the application of a field of waves towards the ingredients, allows accelerating the extraction of the compounds in the ingredients, leading to improved extraction efficiency.

The invention also relates to a method comprising various steps carried out by an apparatus according to the invention.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical elements are designated in the same manner.

DETAILED DESCRIPTION OF THE INVENTION

Figure 1:
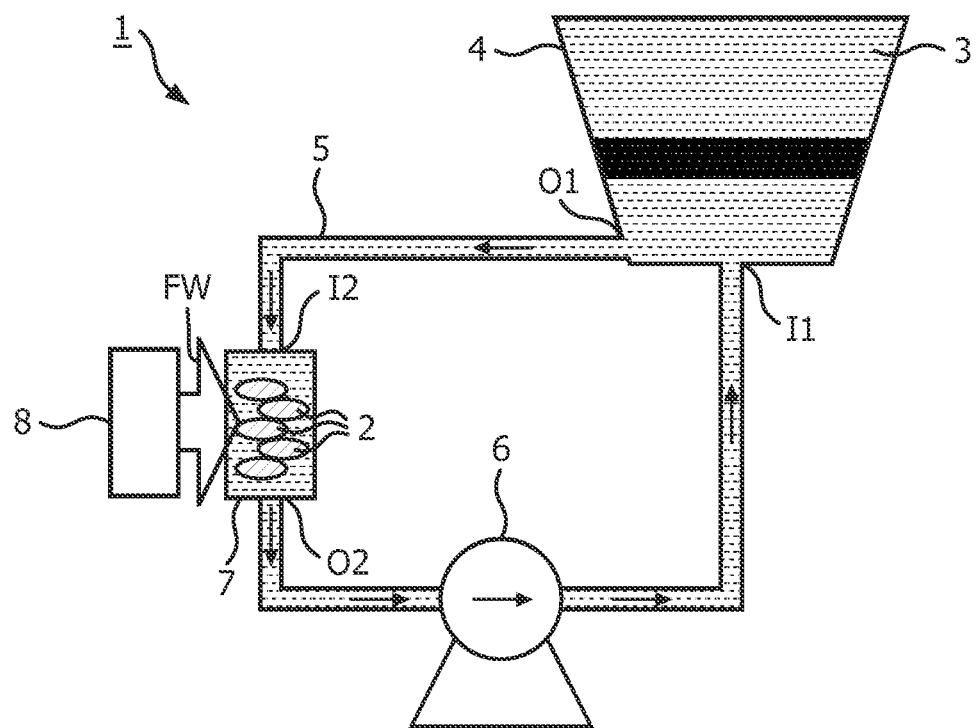
FIG. 1 depicts a first embodiment of an apparatus according to the invention for decocting ingredients in a solvent.

FIG. 1 depicts a first embodiment of an apparatus 1 according to the invention for decocting ingredients 2 in a solvent 3. The apparatus comprises:
- a first container 4 for containing the solvent,
- a pipe 5 connecting an output O1 of said first container to an input I1 of said first container,
- a pump 6 placed in series with said pipe for circulating the solvent from said output O1 to said input I1, a second container 7 for containing the ingredients, said second container being placed in series with said pipe, such that the solvent circulating in the pipe can circulate in between the ingredients, a wave generator 8 placed next to said second container for generating a field of waves FW towards the ingredients.

For example, ingredients may correspond to tea leaves, plants, leaves, coffee beans, herbs, vegetable roots, fruits, or a mix of those ingredients. For example, the solvent may correspond to water, mineral water, tap water, salted water, alcohol, or a mix of those solvents.

The container 4 takes the form of a tank into which the solvent 3 is intended to be poured by a user at the start of the decocting process. For the sake of illustration, the solvent is represented by a plurality of short dotted lines.

The pipe 5 is placed outside the container 4. For example, a pipe made of a material such as plastic or glass can be used.

A first part of the pipe 5 exits from an output O1 of the first container, and connects to an input I2 of the second container. When the solvent enters the second container, it flows through the ingredients, which facilitates extraction of compounds contained in those ingredients.

A second part of the pipe 5 exits from an output O2 of the second container, and connects to the input of the pump 6. The pump 6 is used to create a closed circulation of the solvent outside the first container, the direction of the solvent circulation being illustrated in FIG. 1 by short arrows in the pipe. Any types of pump can be used, and can for example correspond to an electrical water pump. Preferably, the flow rate of the pump is in the order of a few liters per minute. Preferably, the higher the volume of solvent, the higher the flow rate is.

A third part of the pipe 5 exits from the output of the pump, and connects to an input I1 of the first container. The solvent entering the first container and having a higher concentration of compounds extracted from the ingredients, is mixed with fresh solvent already present in the first container, i.e. mixed with solvent having a lower concentration of compounds. Then, solvent in the first container exits into the first part of the pipe 5.

Figure 9A:
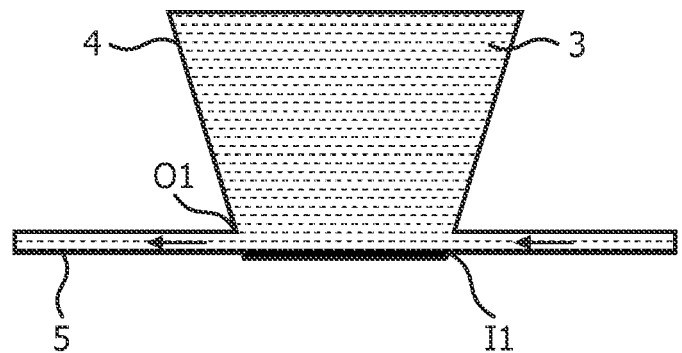
FIG. 9A, FIG. 9B, FIG. 9C, and FIG. 9D depict various embodiments of the first container used in an apparatus according to the invention.
Figure 9B:
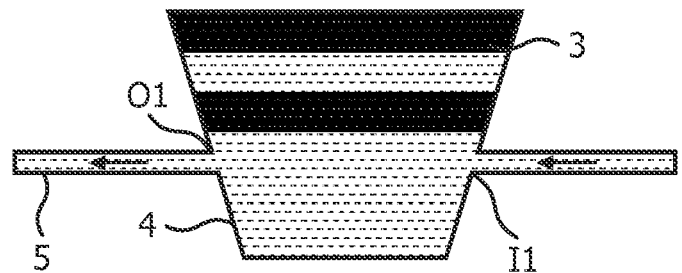
Figure 9C:
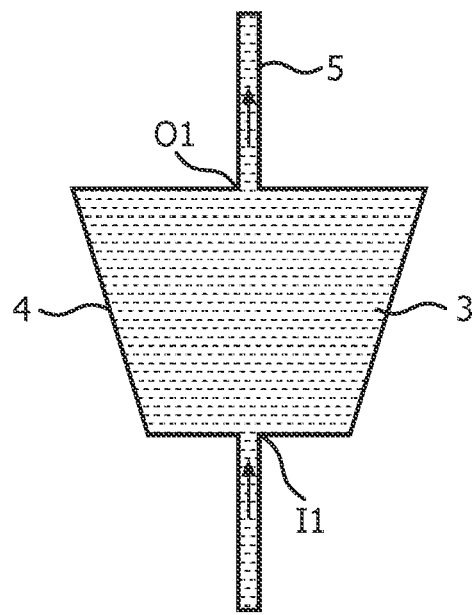
Figure 9D:
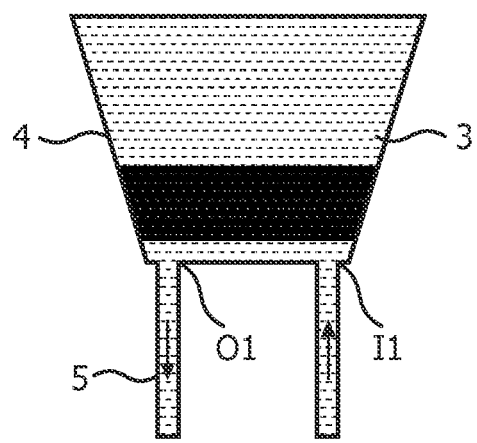

The output O1 and the input I1 of the first container can be placed at different locations:

as illustrated in FIG. 1, the output O1 of the first container is placed at a bottom part in the walls of the first container, and the input I1 is placed at the bottom of the first container, as illustrated in FIG. 9A, the output O1 and the input I1 are each placed at a bottom part in the walls of the first container, for example opposite each other, as illustrated in FIG. 9B, the output O1 and the input I1 are placed in the middle of the walls of the first container, for example opposite each other, as illustrated in FIG. 9C, the output O1 of the first container is placed at the top of the first container, and the input I1 is placed at the bottom of the first container, as illustrated in FIG. 9D, the output O1 and the input I1 are placed at the bottom of the first container.

It is noted that other locations for the output O1 and the input I1 could be considered, as long as the solvent entering the input I1 can be sufficiently mixed with solvent already present in the first container, before it exits the first container through output O1.

To ensure that the solvent, having a high concentration of compounds, flowing out of the second container can be diluted by the larger volume of solvent in the first container having a lower concentration of compounds, the volume of the first container is preferably larger than the volume of the second container, preferably up to a few hundred times larger.

The wave generator 8 placed next to the second container is intended to generate a field of waves FW towards the ingredients. This field of waves is intended to create pores in the membrane of the cells in ingredients by the polarization effect, and/or to disrupt the wall of those cells by the cavitation effect. This facilitates extraction of compounds in the inner part of the ingredients. Considering that the solvent circulates around the ingredients (i.e. the solvent is dynamic and not static), a field of waves of relative low intensity can be used.

The processes of circulating the solvent and applying the field of waves are continued for a given time duration until it is decided, for example via dosing compounds in the solvent or tasting the solvent, that most compounds have been extracted from the ingredients. It is noted that this time duration may be different depending on which ingredients are used, but it is not an object of the invention to elaborate further on said aspect.

Figure 2:
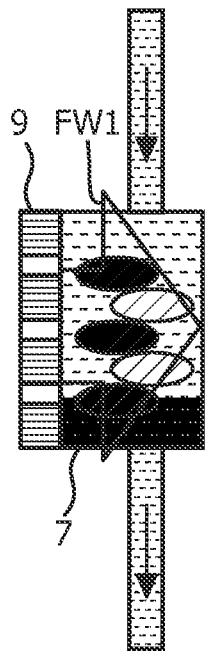
FIG. 2 depicts a partial view of a second embodiment of an apparatus according to the invention for decocting ingredients in a solvent.

FIG. 2 depicts a partial view of a second embodiment of an apparatus 1 according to the invention for decocting ingredients 2 in a solvent 3. In addition to elements comprised in an apparatus as in FIG. 1, the wave generator 8 comprises ultrasound probes 9 for generating a field of ultrasound waves. The field of ultrasound waves is illustrated by arrow FW1. The ultrasound probes are placed adjacent to the walls of the second container so that ultrasound waves can propagate inside the second container, in a way similar to wave propagation in a so-called ultrasonic bath or ultrasonic cleaner. For example, the ultrasound probes correspond to piezoelectric material transducers, and are connected to an external controller (not shown) for generating ultrasound waves in the frequency range [20 kHz; 400 kHz]. The field of ultrasound waves allows disrupting the wall of the cells in the ingredients by the cavitation effect. Alternatively (not shown), the ultrasound probes are not placed adjacent to the walls of the second container, but are placed directly inside the cavity of the second container, so that they plunge into the solvent circulating in the cavity.

Figure 3:
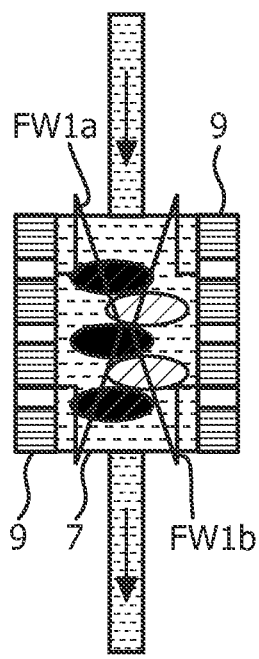
FIG. 3 depicts a partial view of a third embodiment of an apparatus according to the invention for decocting ingredients in a solvent.

FIG. 3 depicts a partial view of a third embodiment of an apparatus 1 according to the invention for decocting ingredients 2 in a solvent 3. In addition to elements comprised in an apparatus as in FIG. 2, the ultrasound probes 9 are placed around the second container 7. The ultrasound probes are placed adjacent to the walls of the second container so that ultrasound waves can propagate inside the second container, in a way similar to wave propagation in a so-called ultrasonic bath. By placing multiple probes around the second container, multiple fields of waves are generated, such as a first field of ultrasound waves FW1$a$ and a second field of ultrasound waves FW1$b$ if two probes are used. This allows applying a field of ultrasound waves along different directions towards the ingredients so as to maximize disruption of the wall of the cells in the ingredients by the cavitation effect.

Figure 4:
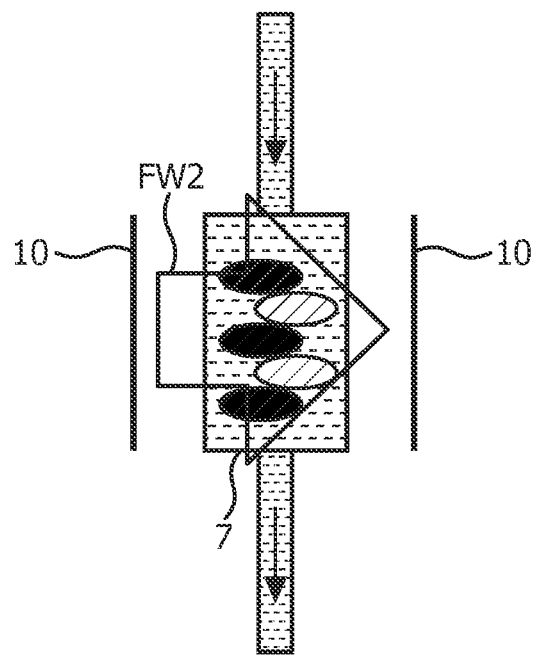
FIG. 4 depicts a partial view of a fourth embodiment of an apparatus according to the invention for decocting ingredients in a solvent.

FIG. 4 depicts a partial view of a fourth embodiment of an apparatus 1 according to the invention for decocting ingredients 2 in a solvent 3. In addition to elements comprised in an apparatus as in FIG. 1, the wave generator 8 comprises a pair of electrodes 10 for generating a field of pulsed electrical waves FW2. The electrodes may correspond to plates, for example made of stainless steel, to which a voltage provided by an external controller (not shown) is applied. When a first voltage is applied to a first electrode and a second voltage is applied to a second electrode, an electrical field is created in between the electrodes by this difference in voltage. Preferably, the electrical field has a frequency in the range [1 Hz; 100 Hz], an electrical gradient in the range [1 kV/cm; 100 kV/cm], and a pulse duration in the range of several microseconds. The field of pulsed electrical waves allows creating pores in the membrane of ingredients, and/or opening/enlarging membrane pores of the ingredients by the polarization effect. Alternatively (not shown), the electrodes are not placed outside the walls of the second container, but are placed directly inside the cavity of the second container.

Preferably, the electrodes 10 are placed around the second container 7. By placing multiple pairs of electrodes around the second container, multiple fields of waves are generated. This allows applying a field of electrical waves along different directions towards the ingredients so as to maximize the creation of pores in the membrane of the ingredients, and/or opening/enlarging the membrane pores of the ingredients by the polarization effect. For example, if the second container has a cubic shape, three pairs of electrodes can be used, each pair being formed by an electrode placed on a given side and a second electrode placed on the opposite side. For example, if the second container has a cylindrical shape, pairs of electrodes can be placed parallel to the longitudinal axis of this cylindrical shape so as to be diametrically opposite each other.

Preferably, the apparatus according to FIG. 4 comprises a system (not shown) to change the distance between the electrodes 10. By changing the distance between the electrodes, the electrical gradient of the electrical field is changed, which may be useful to adapt the characteristics of the electrical field to the type of ingredients to be decocted. For example, in the case that a given type of ingredients requires a higher electrical field density to create pores in the membrane and/or to open/enlarge the pores of the membranes, the distance between the electrodes is decreased. The system for changing the distance between the electrodes may correspond to a sliding carriage which is either manually moved by the user of the apparatus or by an activator in the apparatus itself, depending on a signal generated by a user interface of the apparatus, the value of the signal reflecting the type of ingredients to be decocted.

Figure 5:
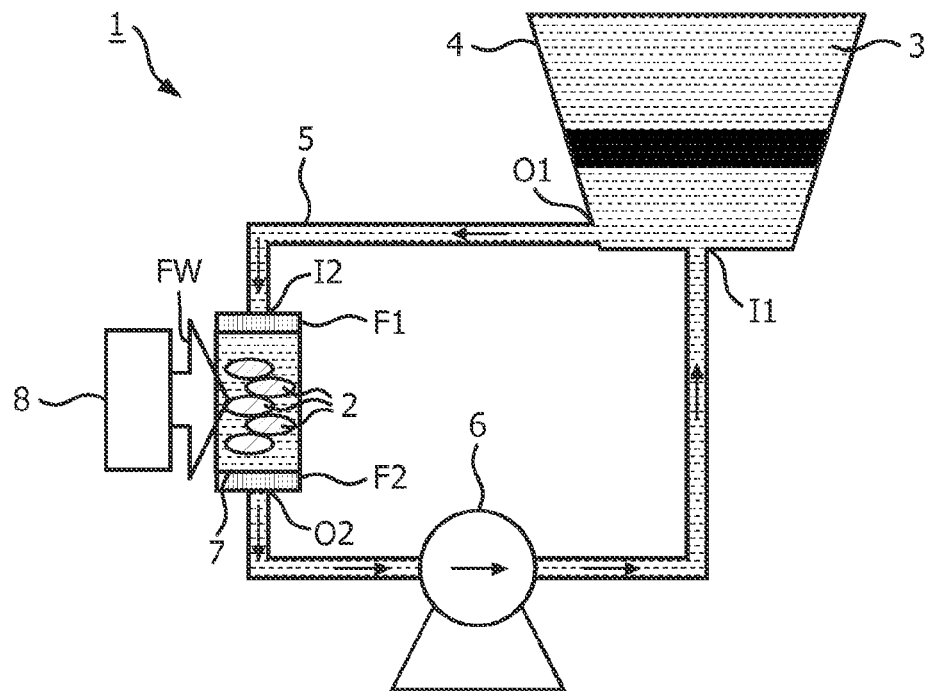
FIG. 5 depicts a fifth embodiment of an apparatus according to the invention for decocting ingredients in a solvent.

FIG. 5 depicts a fifth embodiment of an apparatus 1 according to the invention for decocting ingredients 2 in a solvent 3. In addition to elements comprised in an apparatus as in FIG. 1, the second container comprises an input I2 connected to the pipe via a first filter F1, and an output O2 connected to the pipe via a second filter F2. Those filters are intended to guarantee that ingredients will not leave the second container. After all, when the solvent enters the second container, the circulation of the solvent may cause the ingredients to be ousted from the second container and dispersed along the pipe. Using those filters is particularly relevant if the solvent flow rate is rather important in view of the mass of the ingredients, or if the ingredients are smaller than the inside section of the pipe. By virtue of those filters, ingredients are kept confined to the second container. For example, filters made of plastic or metal and forming a meshed or a net structure can be used. The filters can be sealed or attached to the second container after ingredients have been introduced by a user before the start of the decoction process.

Figure 6:
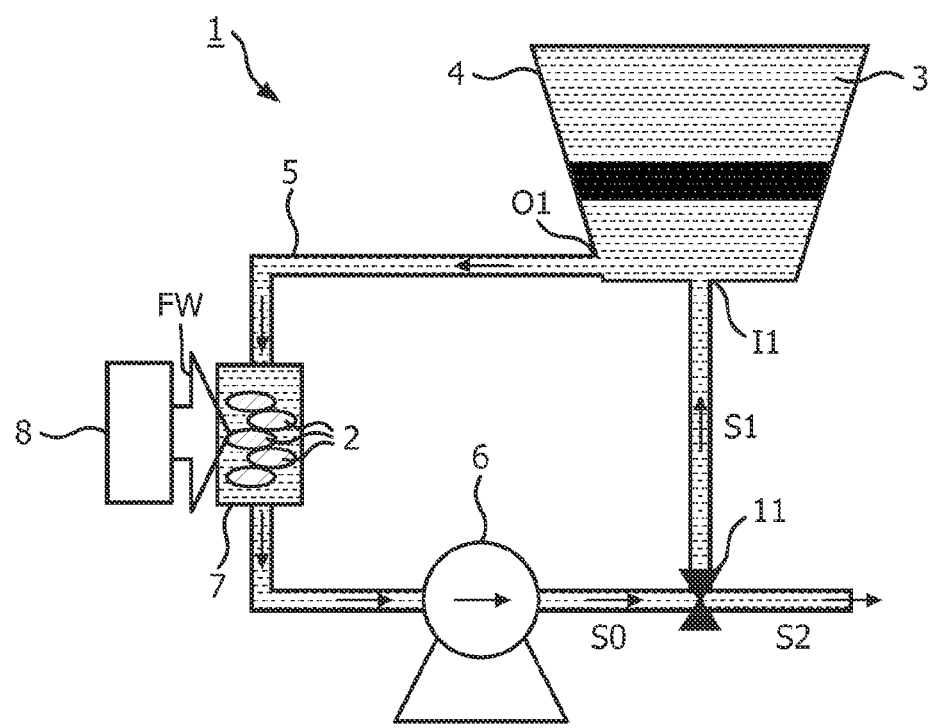
FIG. 6 depicts a sixth embodiment of an apparatus according to the invention for decocting ingredients in a solvent.

FIG. 6 depicts a sixth embodiment of an apparatus 1 according to the invention for decocting ingredients 2 in a solvent 3. In addition to elements comprised in an apparatus as in FIG. 1, this apparatus comprises a valve 11 placed in series with the pipe 5. The valve is adapted to take a first position for circulating the solvent from the output O1 of the first container to the input I1 of the first container, and to take a second position for draining the solvent from the first container. In the first position, the valve connects section S0 of the pipe to section S1 of the pipe, which corresponds to the position during decoction of ingredients. In the second position, the valve connects section S0 of the pipe to an outside section S2 of the pipe, which corresponds to the position during draining solvent from the first container. After all, when the decoction process is terminated, the solvent in the first container corresponds to the drink/beverage comprising compounds extracted from the ingredients. Positioning the valve in the second position thus allows draining the solvent from container 4, for example, into a recipient, such as a glass (not shown). The valve can be a valve which is manually activated by a user, or an electro-valve activated by a system (not shown) when the time duration of the decoction process is over. It is noted that instead of using valve 11, a tap directly connected to a bottom part of the first container could be used, for example a tap which is manually activated by a user.

Figure 7:
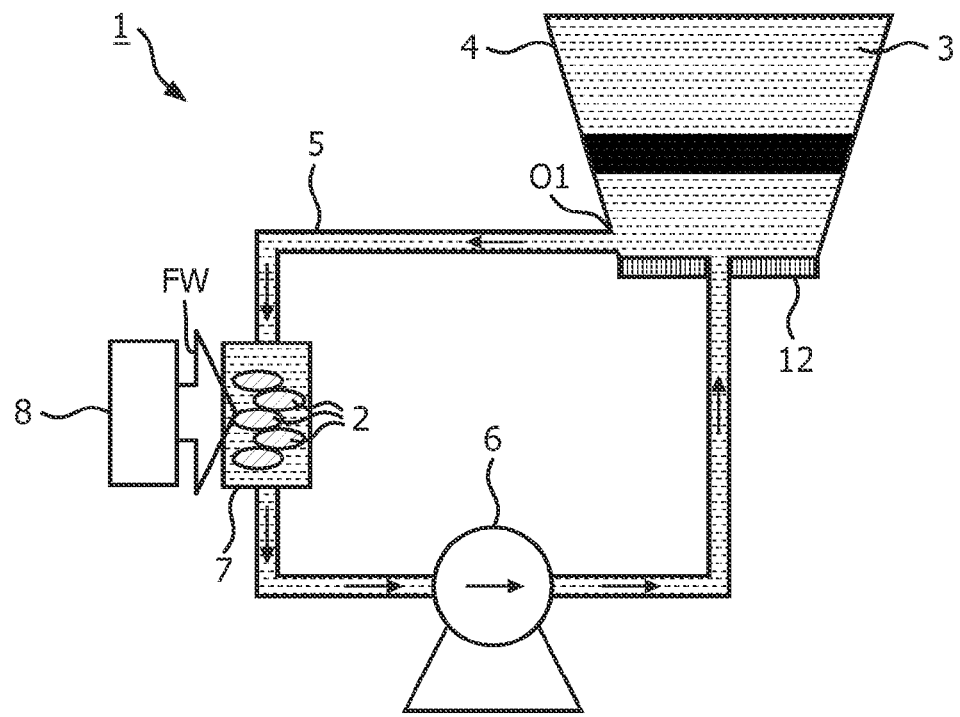
FIG. 7 depicts a seventh embodiment of an apparatus according to the invention for decocting ingredients in a solvent.

FIG. 7 depicts a seventh embodiment of an apparatus 1 according to the invention for decocting ingredients 2 in a solvent 3. In addition to elements comprised in an apparatus as in FIG. 1, this apparatus comprises a heating system 12 placed adjacent to the first container for heating the solvent. The heating system can be placed in the base of the first container, as illustrated, or can be placed along the walls of the first container (not shown). The heating system can advantageously correspond to a resistor supplied by electrical current. The heating system is intended to heat the solvent in the first container, so that heated solvent circulates in between ingredients in the second container.

Figure 8:
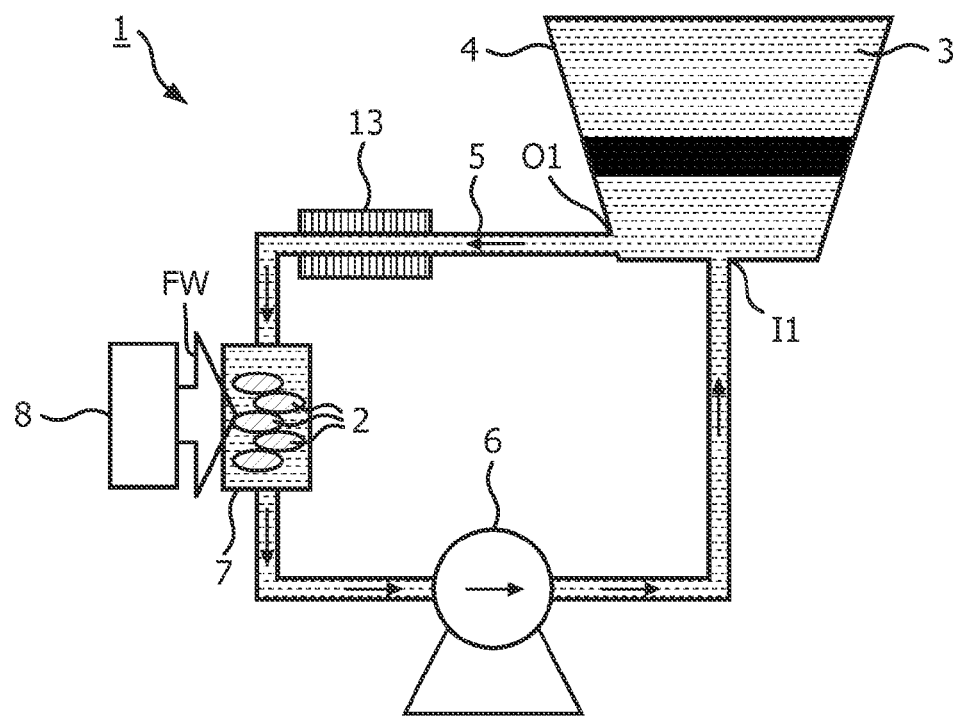
FIG. 8 depicts an eighth embodiment of an apparatus according to the invention for decocting ingredients in a solvent.

FIG. 8 depicts an eighth embodiment of an apparatus 1 according to the invention for decocting ingredients 2 in a solvent 3. In addition to elements comprised in an apparatus as in FIG. 1, this apparatus comprises a heating system 13 placed adjacent to the pipe for heating the solvent. The heating system can be placed adjacent any sections of the pipe. The heating system can advantageously correspond to a resistor supplied by electrical current. The heating system is intended to heat the solvent in the first container, so that heated solvent circulates in between ingredients in the second container.

Figure 10:
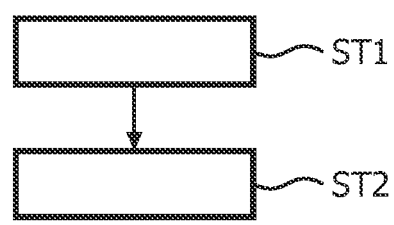
FIG. 10 depicts a method according to the invention of decocting ingredients in a solvent.

FIG. 10 depicts a method according to the invention of decocting ingredients in a solvent. This method comprises the steps of:
- circulating ST1 the solvent in a pipe from an output of a first container containing the solvent, to an input of said first container,
- generating ST2 a field of waves towards the ingredients contained in a second container placed in series with said pipe.

This method comprises the various steps carried out by an apparatus according to the invention as depicted in FIG. 1 to FIG. 8.

While the invention has been illustrated and described in detail in the drawings and foregoing description, such illustration and description are to be considered illustrative or exemplary, and not restrictive; the invention is not limited to the disclosed embodiments. For example, the shape of the first container and second container could be different, while the function remains the same. Although additional features of the apparatus depicted in FIG. 5, FIG. 6, FIG. 7, FIG. 8 have been presented separately, based on an apparatus as depicted in FIG. 1, those features could also be combined in an apparatus as depicted in FIG. 1. In the claims, the word "comprising" does not exclude other elements or steps, and the indefinite article "a" or "an" does not exclude a plurality. Any reference signs in the claims should not be construed as limiting the scope of the invention.

The invention claimed is:
1. An apparatus for decocting ingredients in a solvent, said apparatus comprising:

a first container for containing the solvent;

a plurality of pipes connecting an output of said first container to an input of said first container;

a pump placed in series with said plurality of pipes for circulating the solvent from said output of the first container to said input of the first container;

a second container for containing the ingredients, said second container being placed in series with said plurality of pipes such that the solvent circulating in the plurality of pipes can circulate in between the ingredients; and a wave generator configured to facilitate an extraction of compounds from an inner part of the ingredients, the wave generator being placed next to said second container for generating a field of waves towards the ingredients, wherein the plurality of pipes are connected in series with said pump and said second container there within, wherein the ingredients are confined inside the second container, and wherein one of said plurality of pipes connects an output of the second container to said input of the first container for circulating the solvent devoid of the ingredients and containing a concentration of extracted compounds extracted from the inner part of the ingredients using the field of waves.

2. The apparatus as claimed in claim 1, wherein the wave generator comprises ultrasound probes for generating a field of ultrasound waves.

3. The apparatus as claimed in claim 2, wherein said ultrasound probes are placed around said second container.

4. The apparatus as claimed in claim 1, wherein the wave generator comprises a pair of electrodes for generating a field of pulsed electrical waves.

5. The apparatus as claimed in claim 4, wherein said electrodes are placed around said second container.

6. The apparatus as claimed in claim 4, further comprising a system to change the distance between said pair of electrodes.

7. The apparatus as claimed in claim 1, wherein an input of the second container is connected to one of said plurality of pipes via a first filter, and said output of the second container is connected to another one of said plurality of pipes via a second filter.

8. The apparatus as claimed in claim 1, further comprising a valve placed in series with said plurality of pipes, said valve being configured to take a first position for circulating the solvent from said output of the first container to said input of the first container, and to take a second position for draining the solvent from the first container.

9. The apparatus as claimed in claim 1, further comprising a heating system configured adjacent to said first container for heating the solvent.

10. The apparatus as claimed in claim 1, further comprising a heating system configured adjacent to one of said plurality of pipes for heating the solvent.

11. A method of decocting ingredients in a solvent, said method comprising the acts of:

circulating the solvent in a plurality of pipes from an output of a first container containing the solvent to an input of said first container, wherein the plurality of pipes are connected in series with a second container there within;

generating a field of waves towards the ingredients contained in the second container placed in series with said plurality of pipes;

confining the ingredients inside the second container; and circulating the solvent devoid of the ingredients and containing a concentration of extracted compounds in one of said plurality of pipes connecting an output of the second container to said input of the first container, the concentration of extracted compounds being extracted from an inner part of the ingredients using the generating act.

12. The method of claim 11, wherein the generating act generates ultrasound waves using an ultrasound probe placed around said second container.

13. The method of claim 11, wherein the generating act generates an electrical field of pulsed electrical waves using a pair of electrodes placed around said second container.

14. The method of claim 13, further comprising the act moving the pair of electrodes to change a distance between the electrodes for changing the electrical field.

15. A device for decocting ingredients in a solvent, said device comprising:

means for circulating the solvent in a plurality of pipes from an output of a first container containing the solvent to an input of said first container, wherein the plurality of pipes are connected in series with a second container there within;

means for generating a field of waves towards the ingredients contained in the second container placed in series with said plurality of pipes;

means for confining the ingredients inside the second container; and means for circulating the solvent devoid of the ingredients and containing a concentration of extracted compounds in one of said plurality of pipes connecting an output of the second container to said input of the first container, the concentration of extracted compounds being extracted from an inner part of the ingredients using the means for generating.

16. The device of claim 15, wherein the means for generating comprise an ultrasound probe placed around said second container for generating ultrasound waves.

17. The device of claim 15, wherein the means for generating comprise a pair of electrodes placed around said second container for generating an electrical field of pulsed electrical waves.

18. The device of claim 17, further comprising means for moving the pair of electrodes to change a distance between the electrodes for changing the electrical field.

19. The apparatus as claimed in claim 1, wherein a volume of the first container is at least a five times larger than a volume of the second container for dilution of the solvent entering the first container from said input of the first container.

20. The apparatus as claimed in claim 1, wherein a volume of the first container is at least a hundred times larger than a volume of the second container for dilution of the solvent entering the first container from said input of the first container.

* * * * *